Feb. 4, 1969 E. M. JOST 3,426,172
METHOD OF WELDING A TERMINAL TAB TO THE
PLATE OF AN ELECTROCHEMICAL CELL
Filed Oct. 24, 1965

Ernest M. Jost,
Inventor.
Koenig, Senniger, Powers and Leavitt,
Attorneys.

United States Patent Office 3,426,172
Patented Feb. 4, 1969

3,426,172
METHOD OF WELDING A TERMINAL TAB TO THE PLATE OF AN ELECTROCHEMICAL CELL
Ernest M. Jost, Attleboro, Mass., assignor to Texas Instruments Incorporated, Dallas, Tex., a corporation of Delaware
Filed Oct. 24, 1965, Ser. No. 504,556
U.S. Cl. 219—91     11 Claims
Int. Cl. B23k *11/10*

ABSTRACT OF THE DISCLOSURE

Method of welding a conductive terminal tab to a porous, oxide activated plate for use in an electrochemical cell. The oxides are eliminated from the pores of the substrate metal by introducing, into the area of the weld, a liquid or gaseous oxide reducing agent. The conductive terminal tab is then welded to the oxide-free local area by conventional welding techniques.

---

Among the several objects of the invention may be noted the provision of means for attaching conductive terminal tabs to porous plaque-type plates for electrochemical cells without the necessity for compaction in the tab-attachment area and without involving complications in processing procedures. Other objects and features will be in part apparent and in part pointed out hereinafter.

The invention accordingly comprises the apparatus, constructions and methods hereinafter described, the scope of the invention being indicated in the following claims.

In the accompanying drawings, in which several of various possible embodiments of the invention are illustrated, FIG. 1 is a fragmentary plan view of a plaque-type plate illustrating one form of the invention;

It has been found difficult by former means, such as conventional spot welding, to attach terminal tabs to porous plaque-type plates for electrochemical apparatus. This is because compaction of the porous plaques was required in the welding areas and whether compaction was performed before or after infilling of the usual porous substrates of the plaques, complications occurred in the manufacturing procedures.

Figure 1:
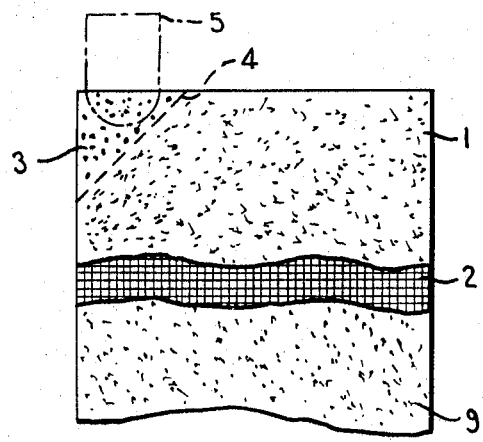

I have found that the activating oxides impregnated in plaque-type plates can be successfully reduced locally after impregnation with the activating oxide and that such local areas are then well-suited for conventional welding of terminal tabs. Referring to FIG. 1, which illustrates one form of the invention, numeral 1 indicates a conventional infilled and impregnated porous plaque which has the usual metal-mesh support 2. Its infilled and impregnated materials are shown by the stippling. For example, but without limitation, in the case of a plaque designed to form a positive electrode in a nickel-cadmium battery, the mesh support 2 may be formed of nickel wire mesh. Infilled in the mesh is sintered carbonyl-nickel powder impregnated with activating nickel oxide for use as a positive electrode in a nickel-cadmium cell. For other impregnating materials on other mesh materials, other oxides may be used. For example, cadmium oxide may be used in the case of a negative electrode having a nickel mesh infilled with sintered carbonyl-nickel powder impregnated with activating cadmium oxide for use as a negative electrode in a nickel-cadmium battery.

After the appropriate activating oxide is in place, the weldment of any tab is interfered with by the oxide. To avoid this, complicated procedures were heretofore resorted to. I avoid difficulty by reducing the oxide to its subsisting metal in an area such as 3 (set off by dotted line 4 in FIG. 1) where the tab 5 (shown by dot-dash lines) is to be welded. To this end I soak the area such as 3 with a suitable reducing compound which will not leave residues in the plaque pores after welding. This may be accomplished by dipping to line 4 in a suitable reducing agent such as molten urea or urea in solution. During welding the urea decomposes, releasing hydrogen and carbon monoxide, which in turn reduces the oxide to its subsisting metal. Other appropriate reducing agents are:

Hydrazine compounds such as hydrazine chloride
Urea oxalate
Hexamethylene tetramine
Formamide
Formic acid It will be understood that if desired the area 3, or at least the part of the mesh support 2 therein, may have been compressed between platens before dipping to obtain a denser welding area at 3 on the plaque. However, this is optional.

Figure 2:
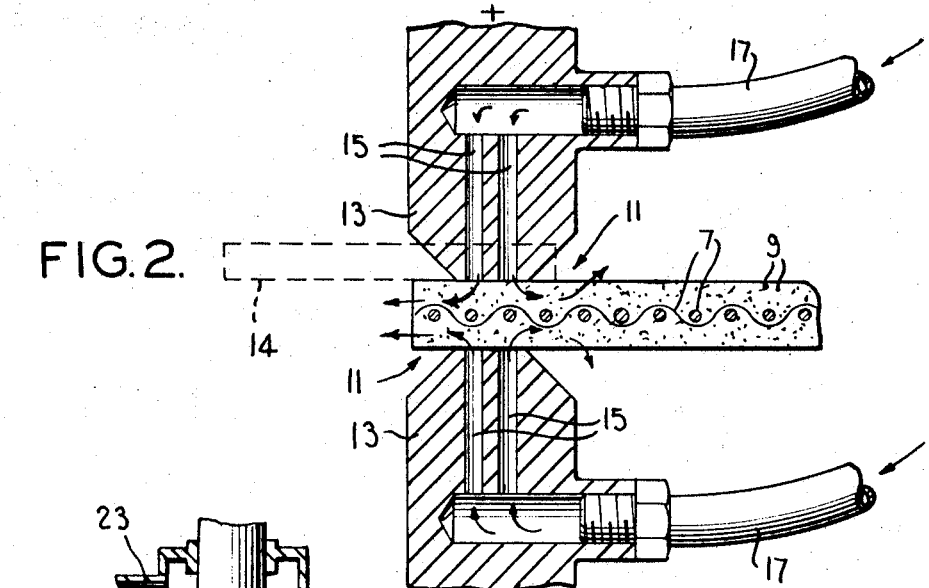
FIG. 2 is a cross section illustrating another form of the invention.

In FIG. 2 is shown an alternative method, wherein numeral 7 indicates a metal-mesh support infilled with the appropriate sintered metal particles 9 which have been impregnated with the appropriate oxide. Numeral 11 indicates the area in which a tab is to be welded. In this case two spot-welding electrodes are shown at numerals 13 which in the usual case may be electrically excited for welding. In FIG. 2 they are shown excited. Each includes passages 15 through which hydrogen or other reducing gas may be blown into the porous welding area 11 while the electrodes are excited. It should be understood that at this point no welding pressure is being applied to the welding area. However, the electrode contacts the area 11 to establish an electrical path to heat the plaque section under area 11. Flexible hoses connected to the passages 15 are shown at 17. By forcing hydrogen through the passages 15, the hydrogen penetrates the heated porous structure of the plaque 7, 9 so as to flood it locally and reduce the oxide to its constituent metal. The reactor water evaporates and is forced out of the pores by the inflowing of hydrogen. The darts illustrate the flow of hydrogen. Thereafter the flow of hydrogen is turned off and either or both electrodes 13 retracted, and the tab emplaced. Such a tab is shown in phantom at 14 in FIG. 2. Alternatively, the tab can be emplaced at the start of the operation in which case the hydrogen would penetrate the hot porous plaque from one side only. In addition, the tab could be suitably perforated to allow inflow of hydrogen from both sides. Then the electrodes are brought together under welding pressure and the welding current adjusted to perform welding. It will be understood that if desired as an alternative one or more ordinary hydrogen nozzles may be brought to bear upon the area 11 to blow hydrogen through it and effect reduction. These may then be retracted and the terminal tab applied and welded by means of separate conventional welding electrodes. Other reducing gases may be used, such as cracked ammonia, cracked city gas or the like.

Figure 3:
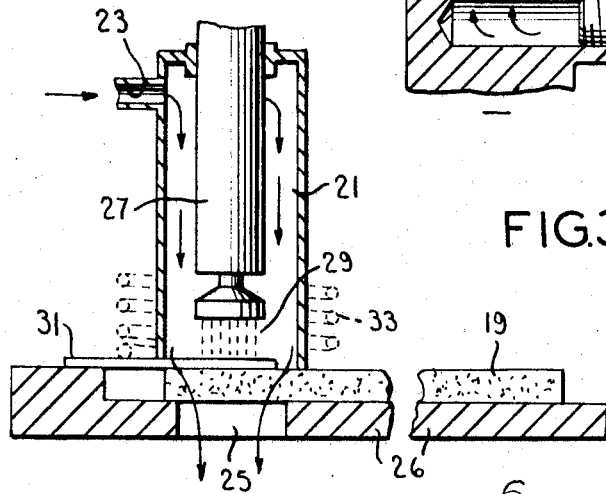
FIG. 3 is a diagrammatic view illustrating other forms of the invention.

A third form of the invention is illustrated in FIG. 3 wherein the local area of the porous plaque 19 and a tab 31 are shown as being located under a passage 21 through which a reducing atmosphere such as hydrogen or the like is circulated from an inlet 23 as shown by the darts. The atmosphere escapes through opening 25 in a support 26. At numeral 27 is shown an apparatus for producing localized heating such as a laser beam 29 directed at the tab 31 which is supported in location on the welding area. Operation of the beam 29 is preferably postponed somewhat after insertion of the members 19 and 31 in the chamber 21 to provide time for substantial reduction of the oxide to metal and removal of the generated water. If desired, induction heating means may be substituted for the laser apparatus 27, as indicated by the induction coil shown in phantom at 33 on FIG. 3. Alternatvely, heating may be by means of an electron gun.

As regards the welding step, it will be understood that while autogenous welding is preferred, i.e., without the addition of extraneously applied metal, other metallurgical bonding means may be employed, such as brazing or soldering, for example. The term "fluid" as used herein includes liquids and gases.

In view of the above, it will be seen that the several objects of the invention are achieved and other advantageous results attained.

As various changes could be made in the above methods, constructions, and products without departing from the scope of the invention, it is intended that all matter contained in the above description or shown in the accompanying drawings shall be interpreted as illustrative and not in a limiting sense.

What is claimed is:

1. The method of connecting a conductive terminal to a plaque-type electrode having a porous metal substrate activated with a metal oxide for use in electrochemical apparatus, comprising introducing an oxide-reducing fluid into a limited area of the porous metal, locally heating the area to convert the activating oxide to its subsisting metal in said limited area, and thereafter spot welding the terminal to the metal within said area.

2. The method according to claim 1, wherein the fluid is an oxide-reducing gas.

3. The method according to claim 1, wherein the substrate metal and the subsisting metal of the oxide are selected from the group consisting of nickel and cadmium.

4. The method according to claim 2, wherein said reducing atmosphere is selected from the group consisting of hydrogen, cracked ammonia and cracked city gas.

5. The method of connecting a conductive terminal to a plaque-type electrode having a porous metal substrate activated with a metal oxide in the substrate for use in electrochemical apparatus, comprising passing an oxide-reducing agent through the preexisting pores of a limited area of such a plaque to convert the activating oxide to its subsisting metal in the pores of said limited area, applying a terminal to the outside of said limited area and by heating effecting welding of the terminal to the electrode within the confines of said limited area.

6. The method according to claim 5, wherein the oxide-reducing agent is a liquid.

7. The method according to claim 6, wherein the liquid is selected from the group consisting of molten urea, urea in solution, hydrazine chloride, urea oxalate, hexamethylene tetramine, formamide and formic acid.

8. The method according to claim 5, wherein the oxide-reducing agent is a gas.

9. The method according to claim 8, wherein the gas is selected from the group consisting of hydrogen, cracked ammonia and cracked city gas.

10. The method according to claim 5, wherein welding is accomplished autogenously by spot welding.

11. The method according to claim 5, wherein welding is accomplished with the addition of metal.

References Cited

UNITED STATES PATENTS

| | | | |
|---|---|---|---|
| 1,327,267 | 1/1920 | Brewster-Weisehan | 219—72 |
| 2,011,873 | 8/1935 | Rava | 219—72 |
| 2,028,780 | 1/1936 | Ito | 219—72 |
| 2,602,871 | 7/1952 | Noland-Szymko | 219—72 |
| 2,886,692 | 5/1959 | Oyler et al. | 219—69 |

RICHARD M. WOOD, *Primary Examiner.*

P. W. MAY, *Assistant Examiner.*

U.S. Cl. X.R.

219—119